May 12, 1931. C. D. BOWKER 1,804,588
AIRSHIP
Filed May 1, 1930 6 Sheets-Sheet 2

May 12, 1931.  C. D. BOWKER  1,804,588
AIRSHIP
Filed May 1, 1930  6 Sheets-Sheet 5

May 12, 1931. C. D. BOWKER 1,804,588
AIRSHIP
Filed May 1, 1930  6 Sheets-Sheet 6

Patented May 12, 1931

1,804,588

UNITED STATES PATENT OFFICE

CLINTON D. BOWKER, OF PHOENIX, ARIZONA

AIRSHIP

Application filed May 1, 1930. Serial No. 449,046.

This invention relates to airships of the heavier than air type and particularly to airplanes having the sustaining plane or aerofoil hollow and filled with gas, hot air or other fluid lighter than air in its normal condition.

A further object is to provide a flying machine having an approximately circular sustaining plane which has a diameter approximately equal to the entire length of the fuselage, thus securing a relatively great sustaining surface.

Another object is to provide an airplane of this character with a parachute containing chamber, in which the parachute is normally disposed in a folded-up condition with means whereby the pilot may release the parachute and whereby air may be carried into the parachute chamber to cause the parachute to issue from the parachute chamber and expand and another object in this connection is to provide means whereby the pilot may draw downward on or release strain exerted on the forward or leading edge of the parachute to thus control the parachute and control the landing of the plane.

A further object is to provide doors in the sides of the fuselage, one door for the passenger and one for the pilot, the doors being located on opposite sides of the fuselage, the doors when opened under certain circumstances permitting air to pass upward into the parachute chamber and if the closure of the parachute chamber be opened, causing the inflation of the parachute.

Another object is to provide means whereby the sustaining plane may be readily inflated or deflated, that is, filled with hot air or gas or the gas or hot air allowed to escape at the will of the pilot and whereby the upper and lower surfaces of the sustaining plane may be tensioned as desired.

A further object is to provide an airplane of this character with a centrally disposed motor room or compartment with a passenger cabin disposed behind the motor compartment and the pilot's cabin disposed in front of the motor compartment to thereby dispose the center of gravity of the machine at the center of the sustaining plane, thus making the plane much safer and easier to handle.

Other objects and advantages will appear in the course of the following description.

My invention is illustrated in the accompanying drawings, wherein:—

Figure is a longitudinal section on the line 8—8 of Figure 2;

Figure 9 is a fragmentary section through the wall of the parachute chamber and the cap and showing one of the hooks for holding the cap closed;

Figure 10 is a detailed sectional view through the shaft of the landing gear and showing in elevation one of the landing wheels and the shock absorber therefor;

Figure 1:
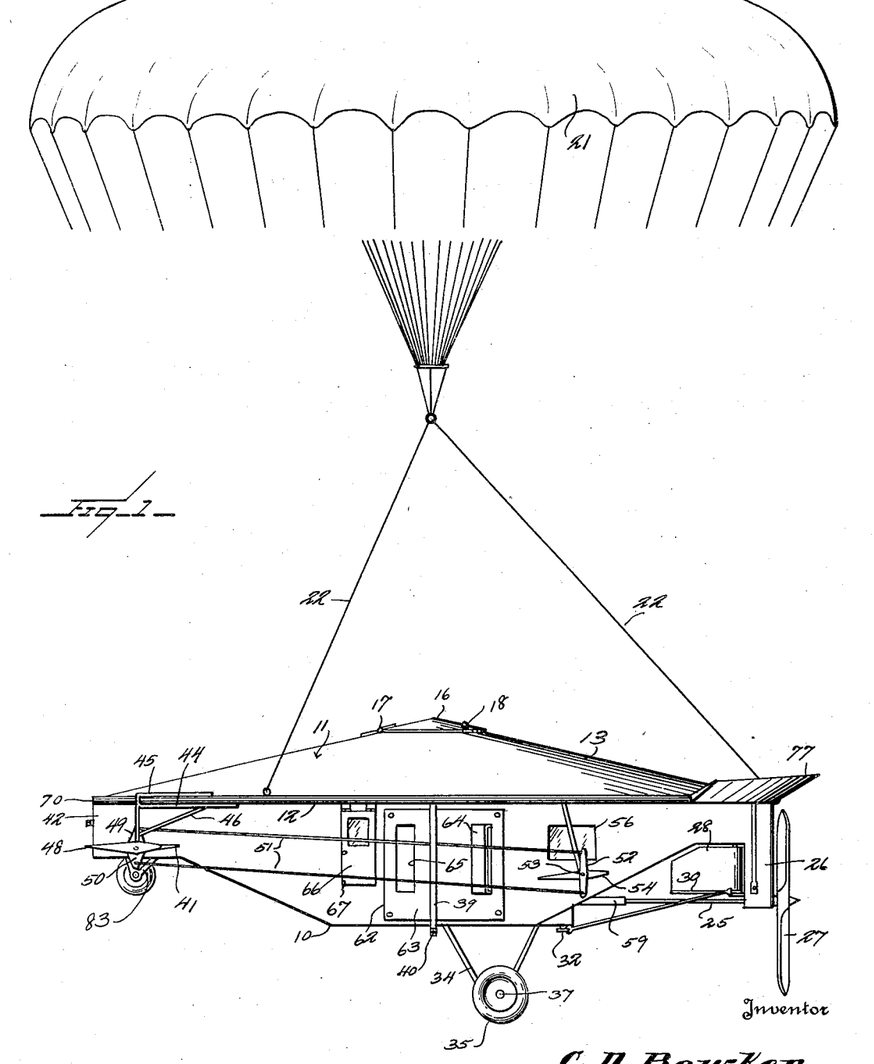
Figure 1 is a side elevation of an airship constructed in accordance with my invention and showing the parachute opened.
Figures 2, 3:
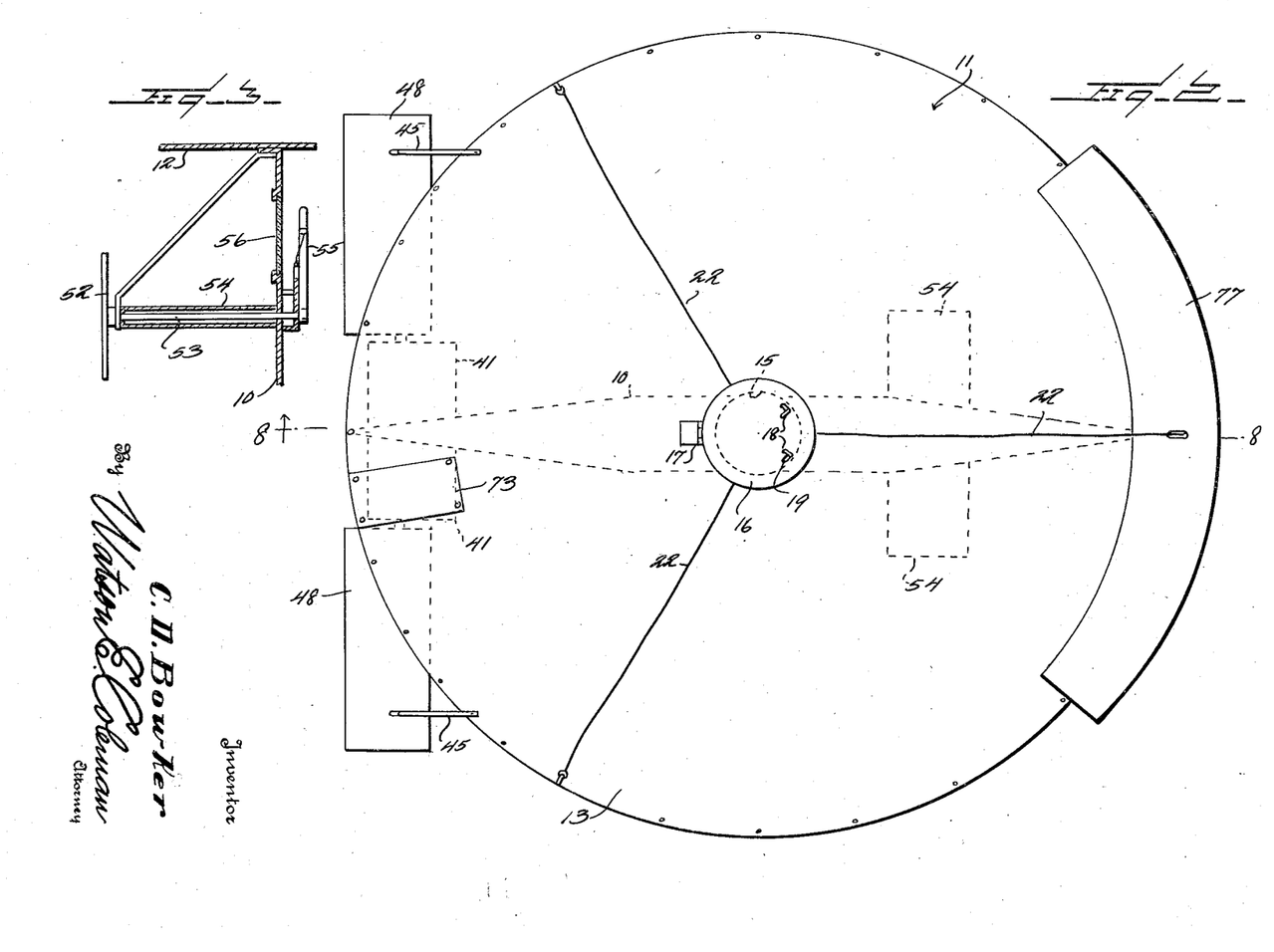
Figure 2 is a top plan view of the ship with the parachute open as shown in figure.
Figure 3 is a sectional detailed view through the fuselage and through one of the lateral fins showing means whereby one of the elevators is operated.
Figures 4, 5:
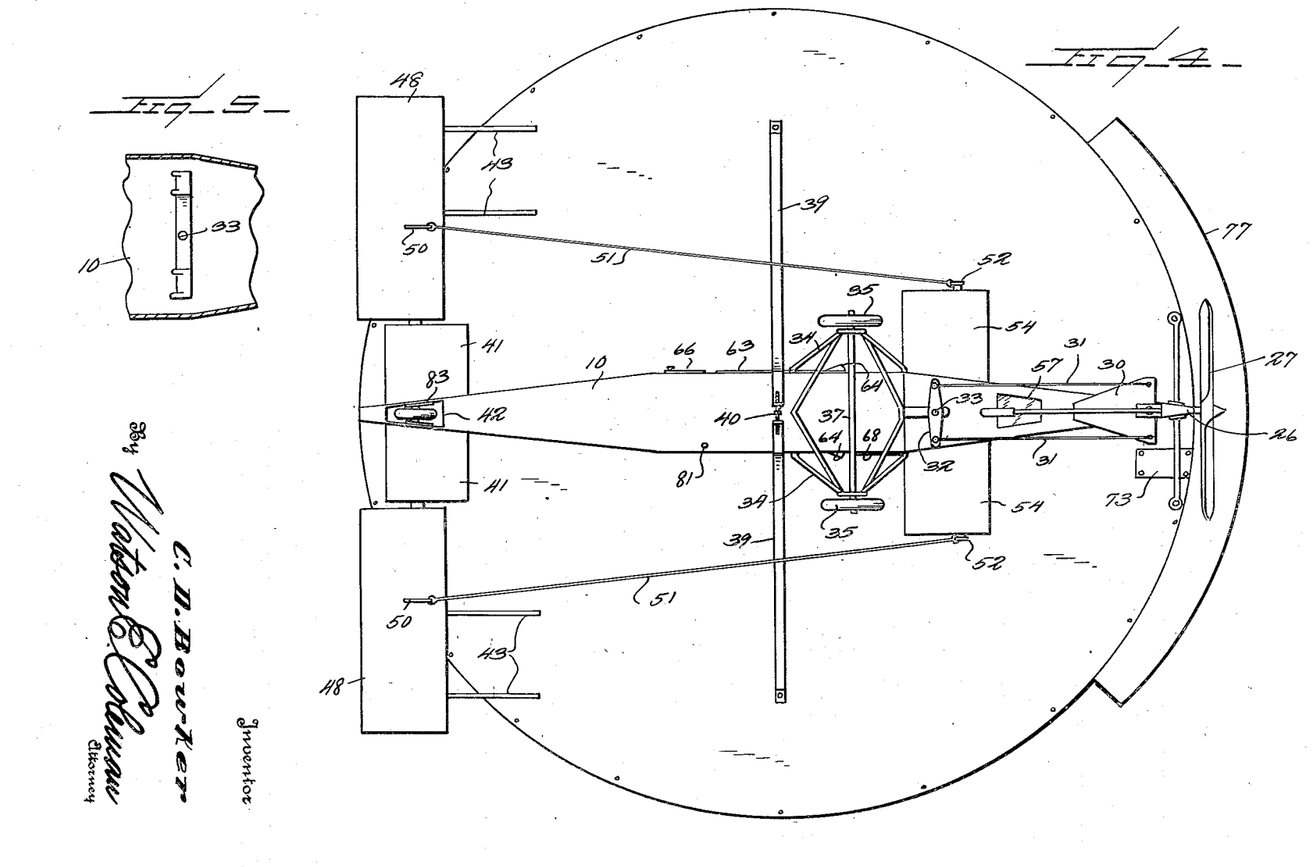
Figure 4 is an under side plan view of the flying machine.
Figure 5 is a sectional view through the fuselage and showing the lever operating means.
Figures 6, 7:
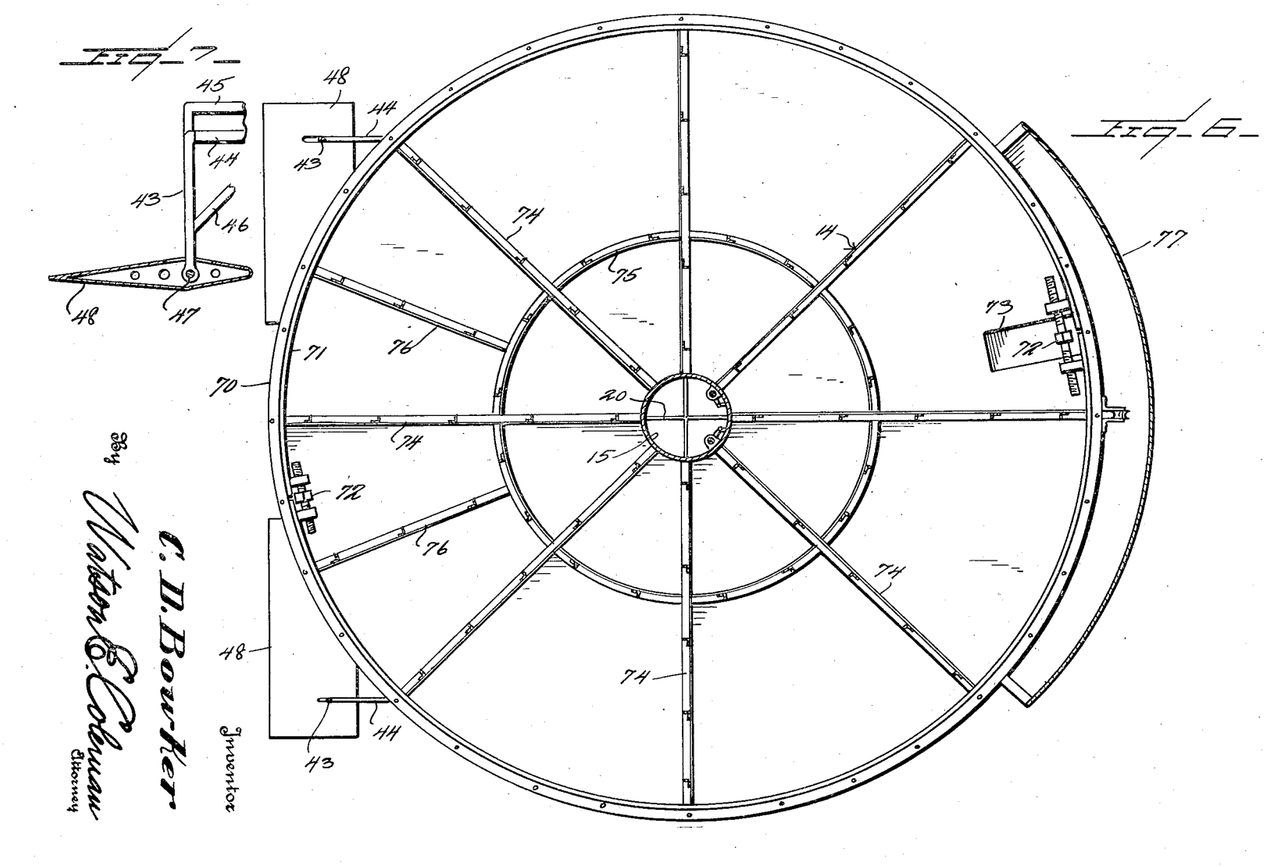
Figure 6 is a horizontal sectional view through the sustaining plane showing the bracing means therefor.
Figure 7 is a sectional view through one of the elevators and the braces therefor.
Figures 8, 9, 11:
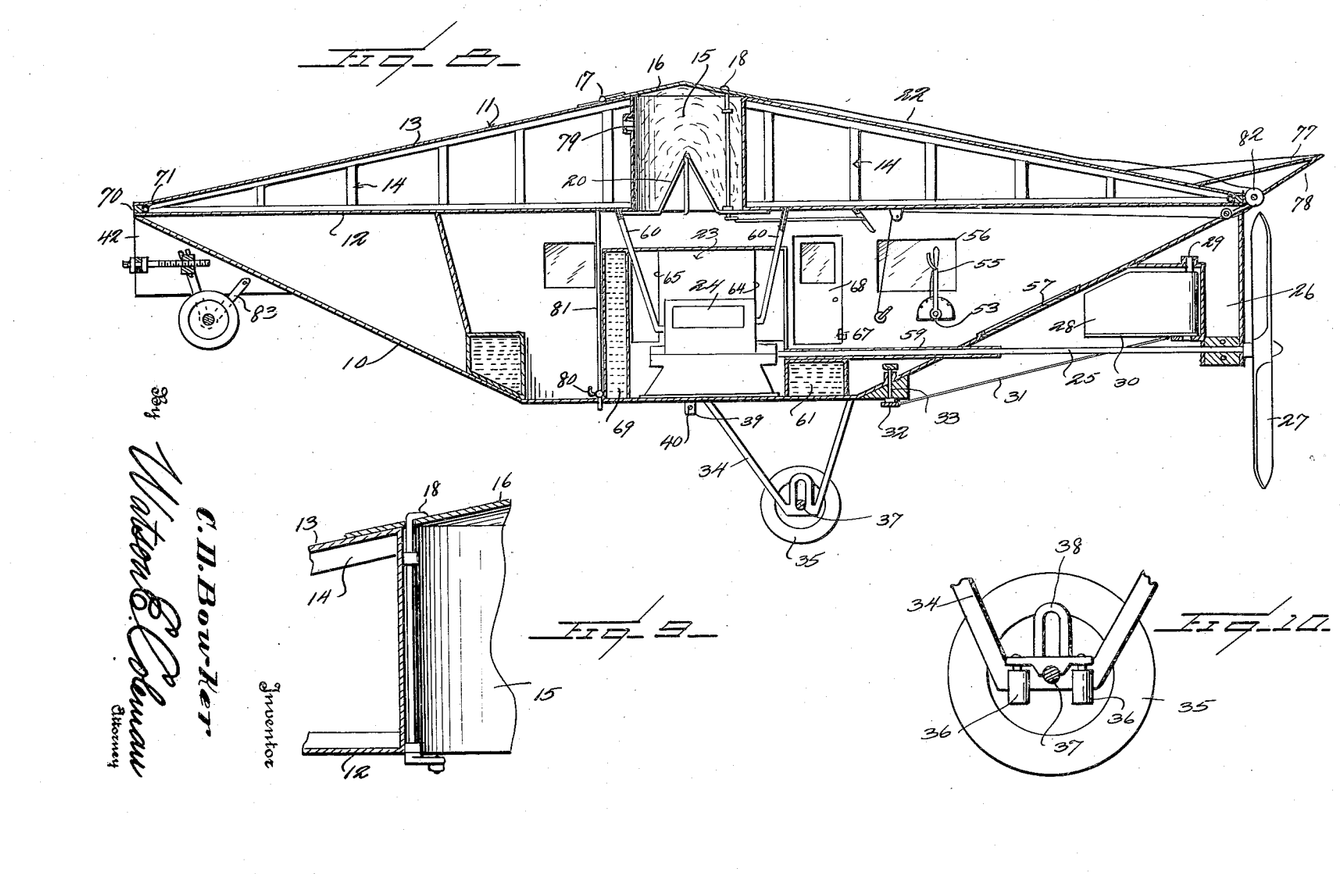
Figures 11, 12, 13:
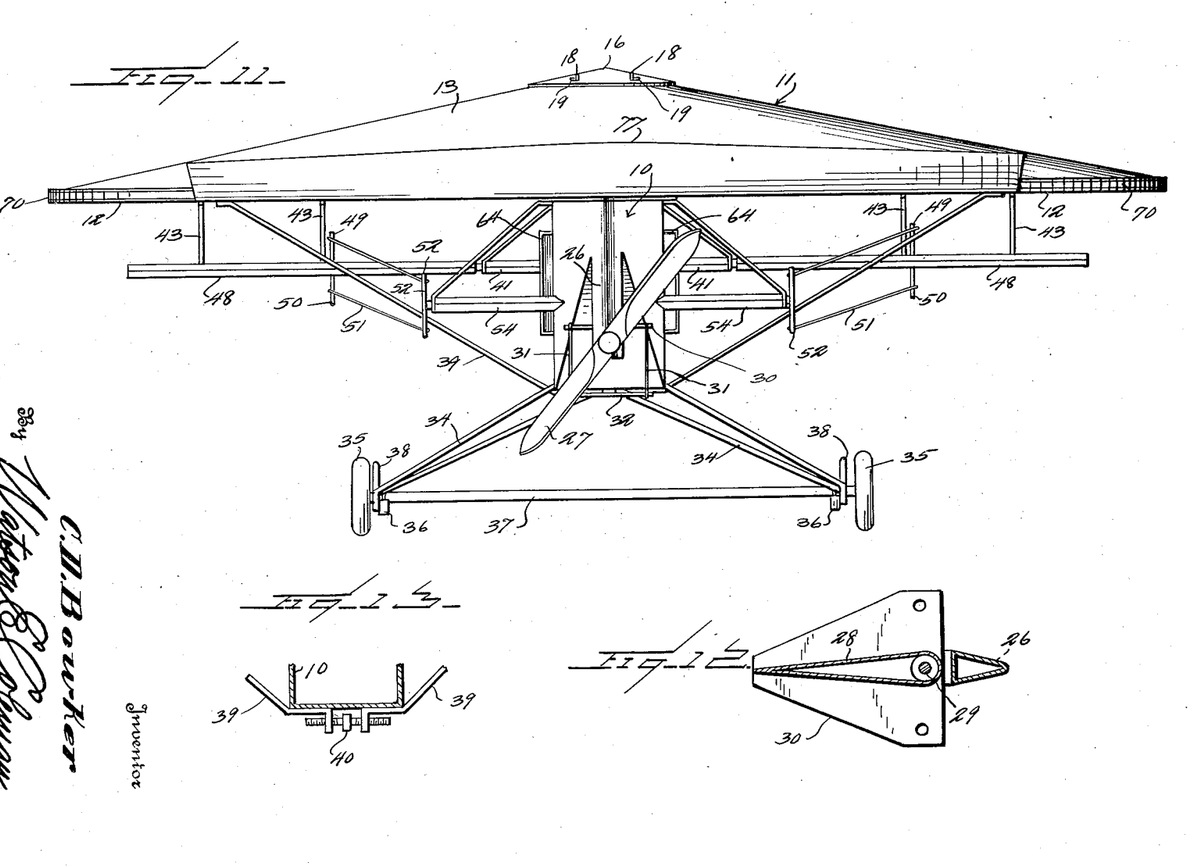
Figure 11 is a front elevation of the flying machine.
Figure 12 is a detailed view of the rudder and allied parts.
Figure 13 is a fragmentary sectional view of the fuselage and showing in elevation the braces therefor.

Referring to these drawings, 10 designates generally the fuselage of the machine and 11 generally the sustaining plane. This sustaining plane is circular in form as shown in Figure 2 and has a diameter approximately equal to the length of the fuselage. The sustaining plane has an approximately flat lower wall 12, though this lower wall may be upwardly cambered if desired, and the upper wall 13 extends upward and centrally from the periphery of the plane toward the middle thereof. The walls 12 and 13 are braced by a series of radial braces 14 and a series of circular braces as will be more fully described hereinafter. At the center of the sustaining plane, there is formed a well 15 or circular compartment extending downward through the sustaining plane and opening at its bottom and at its top through the plane. The top of this circular compartment, which is designed to contain the parachute, is normally closed by a cap 16 hinged at 17, this cap being shown as conical in form in conformity with the conical nature of the upper wall of the sustaining plane. This cap is normally closed by hooks 18 having shanks extending vertically upward through the parachute containing compartment, the margins of the cap being formed with slots 19 through which these hooks are normally disposed, the hooks being normally turned at right angles to the slots so as to hold the cap in place.

It will be understood, however, that other latching means might be used for holding the cap closed. The means whereby these hooks may be released by the pilot will be later described.

Also disposed within the parachute compartment is an upwardly extending frame 20 formed of two inverted V-shaped members disposed at right angles to each other and upon which the parachute in a folded condition is normally carried. The parachute which is generally designated 21 is connected by a plurality of cables 22 to equi-distantly spaced points on the sustaining plane so that when the parachute is discharged from the parachute compartment and opens, these cables will become taut and the parachute will aid in sustaining the plane and permitting it to sink gently to the ground.

The fuselage 10 has a medially disposed motor compartment 23 containing the motor 24. The forward and rear ends of the fuselage are extended upward to intersect the lower surface of the sustaining plane. The motor shaft 25 extends forward through the motor compartment and through a depending power shaft stay 26 which readily supports the forward end of the motor shaft. This shaft at its forward end carries the propeller 27 of any usual or suitable character. Between the power shaft stay 26 and the upwardly inclined forward wall of the fuselage, there is disposed the rudder 28 mounted for transverse swinging movement upon a pivot 29. This rudder is provided at its lower end with the approximately triangular plate 30 which forms a lever whereby the rudder may be manipulated, there being rudder control rods 31 extending rearward from the rudder to the ends of a rudder control bar 32 which is mounted at its middle upon a rudder control shaft 33 extending upward into the pilot's compartment and provided with any suitable controlling means, as for instance, a steering wheel or a steering handle.

Mounted upon and depending below the fuselage slightly forward of the middle thereof is the frame 34 supporting the landing wheels 35. This landing gear is provided with shock absorbers 36 which operatively connect the axle 37 of the landing wheels to the landing gear frame. The landing gear is also provided with safety links 38. Extending downward and inward from the under surface of the sustaining plane are the left and right wing stays 39 which are attached to the under surface of the sustaining plane and at their inner ends are angularly bent to receive a turn buckle 40 whereby these stays may be tightened up, these stays extending beneath the fuselage at their connected ends. These stays act to brace the sustaining plane and to support the fuselage from the sustaining plane.

At the rear end of the fuselage, there are provided the laterally projecting rigid hollow fins 41 and between these fins and at the rear end of the fuselage is the tail wheel housing 42. The manner in which this wheel is mounted will be later adverted to.

Disposed on each side of the fuselage and mounted principally against the under side of the sustaining plane are two frames formed of tubular material, these frames being designated 43. Each frame comprises the horizontally disposed elements 44, a brace 45 which extends from the top surface of the sustaining plane and is connected to the end of the brace 44 and then extends downward and an upwardly and rearwardly inclined brace 46. Extending outward from the rigid face 41 is a shaft 47 upon which is mounted the corresponding control blade or elevator 48. Each blade is hingedly mounted upon the supporting frame 43 and specifically upon the extremities of the elements 45, the control blade being slotted for this purpose and the element 45 extending downward through this slot and being engaged with the shaft 47.

The upper and lower faces of each controlling blade are formed with the horns 49 and 50 and controlling cables or like elements 51 extend from these horns forward to control blade bars or levers 52, each mounted upon a shaft 53 which extends transversely inward through a fixed laterally projecting hollow fin 54 projecting laterally from the fuselage adjacent to the pilot compartment thereof. Each shaft 53 extends laterally inward through the fin 54 and the inner end of each shaft is operatively connected to an operating means such as a light ratchet lever 55 so that the pilot by operating the lever may operate the elevators or control blades 48. I do not wish to be limited to any specific means for operating these controls. Just above the fins 54, the pilot's compartment is provided with the window 56, and the upwardly inclined wall at the forward end of the fuselage is also provided with a glazed portion or window 57 so that the pilot can look downward and see the ground or look forward when the plane is flying.

As before stated, the motor chamber or compartment 23 is disposed approximately at the middle of the fuselage. A tube or housing 59 extends forward from the motor housing or chamber 23 through which the propeller shaft 25 passes, this housing preventing the pilot or passengers from coming in contact with the propeller shaft. A plurality of pipes 60 preferably lead upward from the motor chamber into the interior of the hollow sustaining plane where hot air is to be used for filling the interior of the sustaining plane so that the hot air may be conducted upward from the motor compartment into the sustaining plane or these pipes 60 may be connected to the exhaust pipe of the engine whereby the hot products of combustion will be carried upward into the interior of the sustaining plane.

Forward of the engine compartment 23, is disposed a gas tank 61 which may be used as a seat for the pilot. One side of the fuselage has an opening 62 coinciding with the motor compartment 23, this being normally covered by the plate 63 detachably engaged with the wall of the fuselage so that the plate may be taken out when the motor is installed or when the motor must be removed for repairs. This plate is preferably provided with a cold air inlet hood 64 opening toward the front of the fuselage whereby cold air may be discharged into the engine compartment and a cold air discharge opening or cold air exit opening is designated 65. Rearward of the cold air exit opening, the wall of the fuselage is provided on one side with a door 66 opening into the passenger compartment at the rear of the fuselage, this door being preferably, though not necessarily, supported on hinges on its upper end so that the door may be swung open on its lower end and held open by means of a latch 67. On the opposite side of the fuselage or opening into the pilot's cabin is a door 68 hung in the same manner. If the plane be descending and it is desired to open the parachute, the parachute cap is released by the means heretofore stated, which will cause the parachute cap to open and at the same time the doors 66 and 68 are opened, which will allow air to pass in forcibly into the interior of the fuselage and be carried upward through the opening at the lower end of the parachute housing, thus, if the cap of the parachute housing be open, permitting the parachute to be forced upward and out by the pressure of air and cause the parachute to expand, of course, in the usual manner. The purpose of having these doors disposed one rearward of the middle of the fuselage and the other forward of the middle of the fuselage and on opposite sides of the fuselage is so that the machine will move downward and at the same time maintain a horizontal plane which it would not do if the doors both opened on the same side of the machine.

Gasoline tanks may be formed in any convenient position within the fuselage and are designated 69. The space beneath the passenger's seat and beneath the pilot's seat may be utilized for gasoline tanks.

The sustaining plane may be made of thin sheet material such as aluminum or of cloth. The upper and lower webs of the plane are attached at the circumference of the plane to a ring 70 of relatively soft aluminum or like material and disposed just inward of the ring 70 of the sustaining plane is an annulus 71 preferably formed of steel-tubing or something of this nature. This annulus is split at one point and provided with an expansion screw 72 whereby this ring may be expanded or contracted to thus increase or decrease the tension on the upper and lower webs of the plane. A plate 73 is disposed to cover an opening through the upper web or wall 14 so that access may be had to this screw 72, the plate 73 being held in position by any suitable means.

The sustaining plane is braced by a plurality of radial braces 74 preferably constructed of light metal and preferably formed of angle iron to give as much strength with as much lightness as possible. These are intersected by circular braces 75, these being concentric to the center of the sustaining plane and being braced intermediate their ends by radial braces 76. The leading edge of the plane is formed with a cowling 77, the upper surface of which forms a continuation of the upper surface of the plane, but is upwardly inclined slightly. This cowl has a relatively thin leading edge and the under face of the cowling 78 extends more steeply downward and merges into the under face of the sustaining plane. This cowling may extend around any desired portion of the circumference of the sustaining plane.

For the purpose of forcing the gas into the interior of the sustaining plane, I provide an inflating valve 79 disposed just below the upper end of the parachute housing or chamber 15 and provided with an ordinary inflating valve whereby a hose may be connected so as to discharge gas into the interior of the sustaining plane. A pressure relief valve 80 controls a discharge passage 81 leading from the interior of the sustaining plane, this pressure relief valve being under the control of the pilot so that he can, if desired, reduce any excess pressure of fluid within the interior of the sustaining plane. This is particularly necessary when filling the interior of the sustaining plane with gas as the relief valve will permit the air being forced out as the gas enters.

One of the cables 22 which leads to the parachute 21 passes forward and over a pulley 82 in the cowling. Thence this cable passes back into the pilot's compartment and is connected to suitable means whereby the pilot will take up the cable or let the cable out to thus manipulate the ship and raise or lower the front end of the ship as may be desired which will cause the ship to draw forward or glide backward, dragging the parachute with it. Thus the speed of landing may be controlled. By thus raising or lowering the forward end of the airship, by means of the cable attached to the parachute and also assisted in the control of the ship by the elevators or ailerons, the landing can be readily controlled. The tail wheel housing 42 is preferably mounted so that it may be adjusted to secure a proper clearance of the elevators 48 from the ground. This tail wheel housing is equipped inside with two flat V-shaped steel members 83 extending from the axle of the wheel up to two screws and thus the wheel may be lowered or raised with reference to the fuselage to thus adjust this tail wheel with reference to the elevators to prevent the elevator striking the ground.

The advantages of this invention are as follows: In the course of construction of this airship, it can be manufactured of much lighter material than any other plane known to me. When the interior of the sustaining plane is filled with hot air from the motor or gas, the weight of the plane which is already light may be decreased by approximately one-half or two-thirds according to the amount of the lifting power, which the hot air or gas has. This will in effect double the power of any motor used in the plane. The extreme lightness of a plane built with a combination of these advantages, makes the plane much safer than any other plane known to me. In my plane, the power plant is located centrally. This makes the plane much safer and easier to handle. By having the parachute chamber located in the center of the plane, it is possible for the pilot to land the plane by a parachute, thus avoiding a crash and further permitting the pilot by a proper manipulation of the controls to land his plane in a small space in case of a forced landing. Furthermore, the parachute makes it possible to save the plane as well as the passengers in case of accidents. Not only will a plane built in accordance with my designs be able to land in a much smaller landing field on account of greater wing surface and slower landing speed, but the plane will be able to take off in a shorter run and in much less time than an ordinary plane. Furthermore my plane will be able to maintain either a much slower or a much faster speed than planes constructed in the ordinary manner.

My airship will preferably be constructed of duralumin throughout except as regards the landing gear wheels, steering gear, power shaft and the expansion ring. The expansion ring will press outwardly against the soft aluminum ring to which the upper and lower webs of the plane are attached and thus may be used to stress these webs.

I do not wish to be limited, however, to any particular material for the airship or parts thereof as the material to be used will be that best adapted for the construction of the ship.

I claim:—

1. An airship having a fuselage and a circular supporting plane, the fuselage extending diametrically across the under surface of the plane and being attached thereto and having a length approximately equal to the diameter of the supporting plane, the leading edge of the supporting plane extending upward.

2. An airship having a fuselage and a circular supporting plane, the fuselage extending diametrically across the under surface of the plane and being attached thereto and having a length approximately equal to the diameter of the supporting plane, the leading edge of the supporting plane being formed with upwardly and forwardly angled cowling.

3. An airship having a fuselage and a supporting plane, the plane being circular in plan and hollow whereby it may be filled with a supporting fluid, a circumferential wall forming the periphery of the hollow plane, and means for exerting a constant tension upon said wall.

4. An airship having a fuselage and a supporting plane, the plane being circular in plan and hollow whereby it may be filled with a supporting fluid, a circumferential wall forming the periphery of the hollow plane, and means for exerting a constant tension upon said wall, including an annulus split at one point and an expanding screw engaged with the ends of the split annulus, one surface of the plane having an opening whereby access may be had to the screw and having a plate closing said opening.

5. An airship having a fuselage, a supporting plane, the plane being circular in plan and hollow whereby it may be filled with a supporting fluid, the fuselage extending diametrically across the bottom of the plane and having a length approximately equal to the diameter of the plane, a propeller mounted upon the forward end of the fuselage, elevators mounted upon the rear end of the plane, control means for said elevators, a rudder mounted upon the forward end of the fuselage, control means therefor, a motor disposed approximately in the middle of the fuselage, a shaft extending from the motor through the fuselage and to the propeller.

6. An airship having a hollow, circular supporting plane, a fuselage connected to the plane and depending therefrom, the fuselage having a length equal to the diameter of the plane, the fuselage extending upward and outward at its ends toward the plane, a motor mounted in the middle of the plane, a propeller carried by the fuselage and operatively connected to the motor, a rudder mounted upon the fuselage and having suitable controls, laterally disposed elevators tiltably mounted upon the rear of the plane below the under side thereof, and having suitable controls, the forward and rear ends of the fuselage constituting a pilot's compartment and a passenger compartment respectively.

7. An airship having a supporting plane, circular in plan, the plane being hollow, a fuselage connected to the under side of the plane and depending therefrom, the upper wall of the plane extending upward and centrally, a parachute compartment disposed vertically through the middle of the plane and open at its top and bottom, the bottom of the compartment opening into the fuselage, a cap normally closing the top of the compartment, pilot releasable means for holding the cap closed, and means for permitting air to enter the fuselage and pass upward through the parachute compartment to force the parachute out from the compartment when the cap is released, the parachute being connected by cables to the plane.

8. An airship having a supporting plane circular in plan, the plane being hollow, a fuselage connected to the under side of the plane and depending therefrom, a parachute compartment disposed vertically through the middle of the plane and open at its top and bottom, the bottom of the compartment opening into the fuselage, a cap normally closing the top of the compartment, pilot releasable means for holding the cap closed, and means for permitting air to enter the fuselage and pass upward through the parachute compartment to force the parachute out from the compartment when the cap is released, including outwardly swinging doors on the fuselage, the doors being hinged at their upper ends, and means for holding said doors with their lower ends swung outwardly.

9. An airship having a supporting plane circular in plan, the plane being hollow, a fuselage connected to the under side of the plane and depending therefrom, a parachute compartment disposed vertically through the middle of the plane and open at its top and bottom, the bottom of the compartment opening into the fuselage, a cap normally closing the top of the compartment, pilot releasable means for holding the cap closed, and means for permitting air to enter the fuselage and pass upward through the parachute compartment to force the parachute out from the compartment when the cap is released, including outwardly swinging doors on the fuselage, the doors being hinged at their upper ends, and means for holding said doors with their lower ends swung outwardly, one of said doors being located toward the rear of the fuselage on one side of the fuselage, and the other being located on the opposite side of the fuselage and adjacent the front of the fuselage.

10. An airship having a supporting plane circular in plan, the plane being hollow, a fuselage attached to the under surface of the plane and depending therefrom, a parachute compartment disposed at the center of the plane and opening at its lower end into the fuselage and open at its upper end, a hinged cap for the compartment, pilot releasable means for holding said cap closed, an approximately conical open frame disposed within the compartment and upon which the parachute may be carried in a partially unfolded condition, and means for admitting air to the interior of the fuselage whereby said air, when the cap is released, will force the parachute out of its compartment, the parachute being connected by cables to the plane.

11. An airship having a supporting plane circular in plan, the plane being hollow, a fuselage attached to the under surface of the plane and depending therefrom, a parachute compartment disposed at the center of the plane and opening at its lower end into the fuselage and open at its upper end, a hinged cap for the compartment, pilot releasable means for holding said cap closed, an approximately conical open frame disposed within the compartment and upon which the parachute may be carried in a partially unfolded condition, and means for admitting air to the interior of the fuselage whereby said air, when the cap is released will force the parachute out of its compartment, the parachute being connected by cables to the plane, one of said cables extending over the entering edge of the plane and extending rearward into the fuselage whereby the leading edge of the parachute may be controlled.

12. An airship having a hollow supporting plane and a fuselage depending therefrom and extending diametrically across the plane, the center of gravity of the fuselage and plane being at the middle of the fuselage, hollow fins extending out from the fuselage forward of the middle, hollow fins extending out from the fuselage at the rear end of the fuselage, elevators pivotally supported upon said rearward hollow fins, brackets providing additional means for pivotally supporting the elevators, each elevator having oppositely directed horns, levers mounted upon the first named hollow fins and having flexible connections to said horns and operating shafts extending from the hollow fins into the fuselage and connected to said levers.

13. In an airship, a hollow circular supporting plane, a fuselage extending diametrically across said plane, and depending from the lower wall thereof, and a brace for the plane and fuselage formed in two sections, each section extending downward and toward the center of the plane, the sections meeting below the fuselage, and means connecting said sections whereby the sections may be drawn toward each other or forced apart.

14. In an airship, a supporting plane formed of upper and lower spaced webs of material, the plane being approximately circular in plan, a marginal ring to which the upper and lower webs of the plane are attached, and means for expanding said ring to thereby stretch and tension the upper and lower webs.

15. An airship having a hollow supporting plane, a fuselage connected to the under side of the plane and depending therefrom, a parachute compartment disposed vertically through the middle of the plane and open at its upper and lower ends, the lower end of the compartment opening into the fuselage, means normally closing the upper end of the compartment, pilot releasable means for holding the closing means closed, and means for permitting air to enter the fuselage and pass upward through the compartment to force the parachute out through the compartment when the closing means is released, the parachute being operatively connected to the plane.

In testimony whereof I hereunto affix my signature.

CLINTON D. BOWKER.